Sept. 15, 1942.　　　A. G. BANCROFT　　　2,295,624
REFRIGERATOR CAR CONSTRUCTION
Filed May 5, 1941　　　2 Sheets—Sheet 2
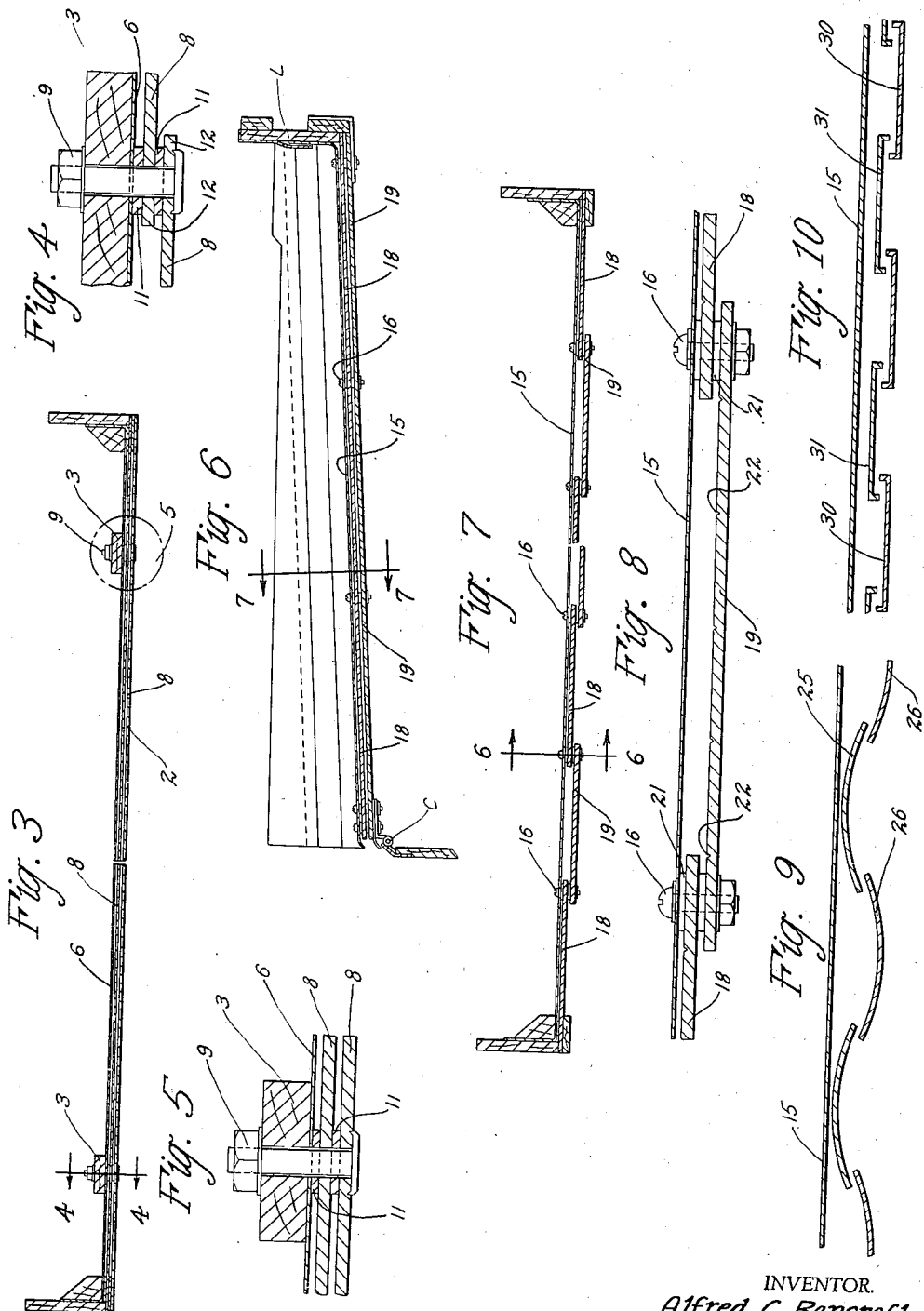
INVENTOR.
Alfred G. Bancroft
BY
Attorney Patented Sept. 15, 1942

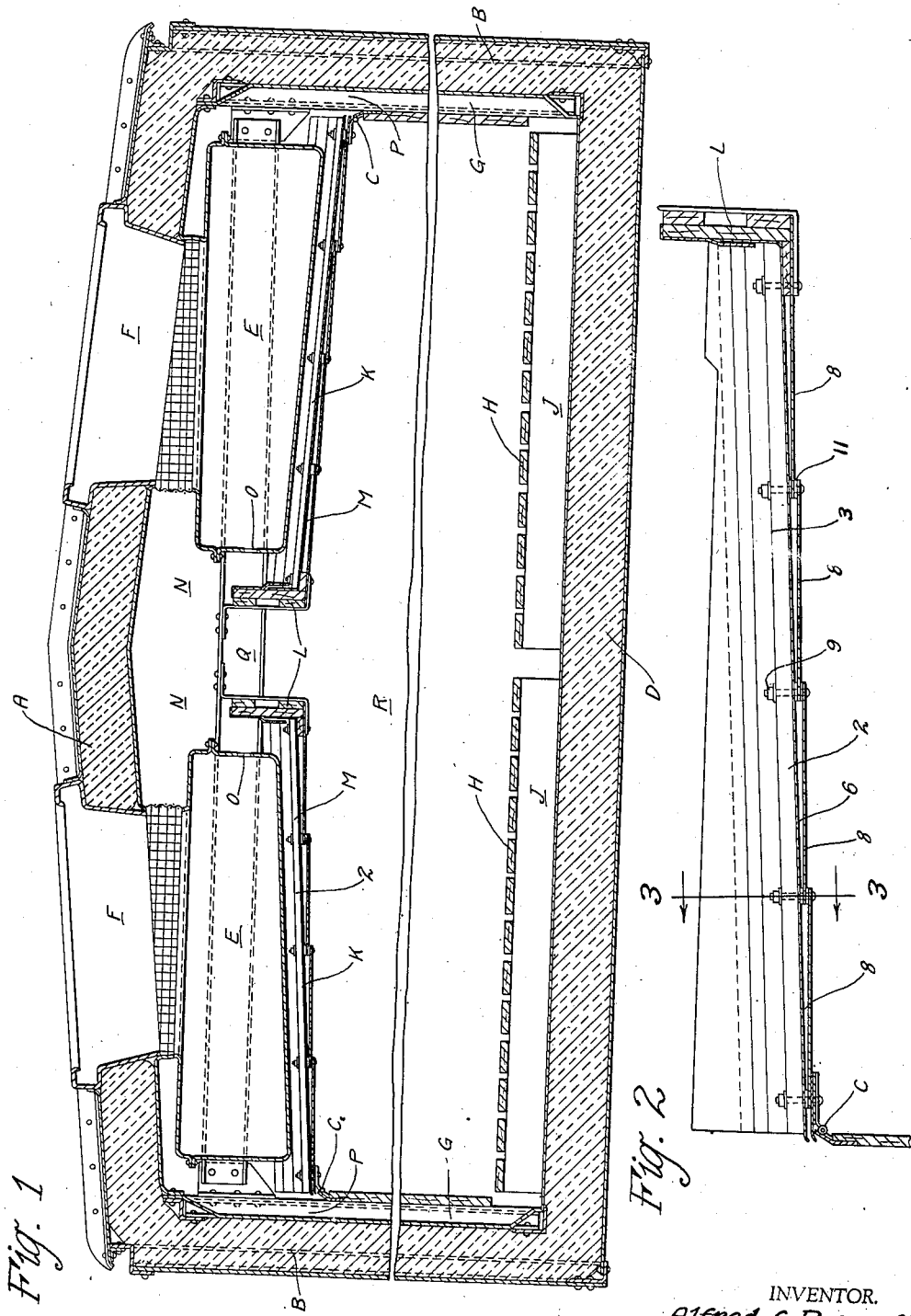

2,295,624

UNITED STATES PATENT OFFICE 2,295,624

REFRIGERATOR CAR CONSTRUCTION

Alfred G. Bancroft, Chicago, Ill., assignor to Standard Railway Devices Company, a corporation of Delaware Application May 5, 1941, Serial No. 391,839

8 Claims. (Cl. 62—17)

This invention relates to refrigerator cars used to transport perishable commodities at a predetermined temperature. The essential features of a refrigerator car are an insulated body to prevent or retard ingress of heat during warm weather and egress of heat during cold weather and a cooling means and often a heating means to be used during warm and cold weather respectively.

This invention applies particularly to cars in which the cooling means, preferably containers for water ice, eutectic ice, brine or dry ice, are disposed immediately below the roof of the car. The lading is supported in spaced relation to the floor by a foraminous rack. Flues, preferably associated with the side walls of the car, communicate between the cooling means and the space under the floor rack to provide a path for the circulation of air. The path is from the cooling means downwardly through the aforementioned flues, through the space under the floor rack, upwardly through the lading compartment thereby cooling the lading, and finally to the cooling means from where the cycle is repeated.

The type of commodity hauled in a refrigerator car of this type and the method employed for loading such commodity is an important factor in the refrigerating efficiency of the car. The commodity should preferably be loaded loosely so as to leave air channels for the flow of cold air through the lading compartment from the lower to the upper part of the car. If the commodity is loaded tightly, no air channels are provided and the cold air is prevented from reaching the upper part of the lading compartment; the commodity in such upper part is, therefore, not well refrigerated.

Certain commodities, particularly fresh fruits and vegetables, give off heat of respiration caused by chemical changes which occur within the fruit or vegetable during ripening thereof. The air within the lading compartment is warmed by the heat of respiration and there is a tendency for such warm air to collect in the upper part of the lading compartment, thereby maintaining the upper part of the lading at a relatively high temperature.

Such commodities as fresh fruits and vegetables contain a large percentage of liquid and, when the circulating air passes over such a commodity, some of the liquid is evaporated and carried away by the air in the form of vapor. When such vapor-laden air touches the relatively cold drip pans usually provided below the refrigerator containers, moisture is condensed from the air by the cold pans and drips upon the commodity. The commodity may be damaged by such moisture and, in most cases, the cartons which contain the commodity are soiled and their marketable value decreased.

An object of the invention is to provide a drip pan below a refrigerant container, which drip pan has a relatively high thermal conductivity so that when the commodity is tightly loaded in the lading compartment, the upper parts of the commodity may be cooled by conduction through the drip pan.

Another object is to form the above mentioned drip pan in such a way that moisture condensed from the air by contact of such air with the drip pan is prevented from dripping upon the lading.

More particularly, the object of the invention is to catch and drain moisture condensed from the air by the cold drip pan. The drip pan is comprised of a relatively thin metallic sheet to provide for heat conduction between the refrigerant chamber and the lading compartment and a novel arrangement of slats arranged so as to permit air to come in contact with the lower side of the metallic sheet and so as to catch moisture which is condensed upon and drips from the metallic sheet.

Other objects and advantages of my invention will be apparent from the following detailed description by referring to the accompanying drawings.

In the drawings:

Figure 1 is a transverse section through a refrigerator car embodying my invention.

Figure 2 is an enlarged view of the drip pan shown in Figure 1.

Figure 3 is a section on line 3—3 of Figure 2.

Figure 4 is an enlarged section on line 4—4 of Figure 3.

Figure 5 is an enlarged view of the encircled portion (5) of Figure 3.

Figures 6 and 7 are views similar to Figures 2 and 3, respectively, showing a modified form of the invention.

Figure 8 is an enlarged view of a portion of Figure 7.

Figures 9 and 10 are views similar to Figure 8 showing modified forms of the invention.

The general parts of the refrigerator car shown in Figure 1 are insulated roof A; side walls B; floor D; refrigerant containers E; hatches F for loading refrigerant into the containers E; side wall flues G; foraminous floor rack H and space J between the rack H and the floor D. A refrigerant container E is positioned directly below the roof A and adjacent a side wall B. A drip pan K, preferably hinged (C) to the side wall B, is provided below the container E and a partition L is disposed in an upstanding position at the edge of and preferably formed integral with the drip pan K. The drip pan K and the partition L cooperate with the roof A and the upper part of the side wall B to form an enclosure M around the container E, an air inlet opening N to the enclosure M being provided by spacing the partition L from the roof A. An air discharge opening P leads from the enclosure M to the flue G at a lower elevation than the air inlet opening N. The refrigerant container E may be provided with one or more apertures O for overflow of liquid refrigerant, which refrigerant is conducted by the drip pan K and flue G to the lower part of the car from which it may be drained by suitable means. Cars of this type commonly have a row of refrigerant containers E near each side wall B, which containers are spaced apart at the center of the car. The partitions L are also spaced apart to form a duct Q which communicates between the lading compartment R and openings N.

Air circulation is as follows: Air in the lading compartment R is warmed by contact with the lading and rises through the duct Q to enter the enclosing structures M through the air inlet openings N. The air is then cooled by contact with the cold refrigerant containers E and falls by reason of its lower temperature and therefore greater density through the discharge openings P and flues G into the space J whence it rises through the rack H to the lading compartment R. The above described cycle is thereafter continuously repeated.

In the modification shown in Figures 1 to 5, the drip pan 2 comprises transversely extending battens 3 having a relatively thin metallic sheet 6 extending between and secured to the battens 3 adjacent the lower sides thereof. Longitudinally extending slats 8 are provided below the metallic sheet 6, which slats 8 are secured to the battens 3 by bolts 9 and spaced from each other and from the metallic sheet 6 by washers 11. The adjacent marginal portions 12 of adjacent slats 8 are spaced apart vertically in overlapping relation so that air within the lading compartment R can pass therebetween and be cooled by contact with the metallic sheet 6. Moisture condensed from the air by the metallic sheet 6 is drained from one to the other of the slats 8 and finally deposited into the side wall flue G.

In the modification shown in Figures 6 to 8, transversely extending slats are arranged below the metallic sheet 15 and secured thereto by bolts 16. Certain (18) of the slats are disposed in an upper plane and others (19) of the slats in a lower plane spaced from the upper plane; with slats 19 in the lower plane underlying the spaces between the slats 18 in the upper plane. The slats 18, 19 are spaced apart from each other and from the metallic sheet 15 by washers 21 and are arranged to function as battens for the purpose of supporting the metallic sheet 15. As shown in Figure 8, the upper surfaces of the slats 18, 19 may be provided with grooves 22 to guide condensed liquid into the side wall flues G.

Figure 9 shows a modification wherein the slats 25 in the upper plane are convexed upwardly and the slats 26 in the lower plane are concave upwardly so that liquid deposited on the upper slats 25 is drained to the lower slats 26 and then directed by the lower slats 26 to the side wall flue G.

The modification shown in Figure 10 is similar to that shown in Figure 9 except that the slats are formed of upwardly (30) and downwardly (31) facing channels instead of the arcuate members shown in Figure 9.

The accompanying drawings illustrate the preferred form of the invention, though it is to be understood that the invention is not limited to the exact details of construction shown and described, as it is obvious that various modifications thereof, within the scope of the claims, will occur to persons skilled in the art.

I claim:

1. In a refrigerator having a storage compartment, the combination of a refrigerant container above the storage compartment, an enclosure for said container formed at least in part by a partition below said container, means to conduct cold air from said enclosure to the lower part of said storage compartment and means to direct warm air from the upper part of said storage compartment to said enclosure, said partition comprising a waterproof upper part having a relatively high thermal conductivity, whereby the upper part of said storage compartment is refrigerated by conduction through said partition and spaced apart waterproof slats underlying substantially the entire area of said upper part, whereby said slats prevent dripping of condensed moisture into the storage compartment and permit air in said compartment to contact the lower surface of said upper part.

2. In a refrigerator having a storage compartment, the combination of a refrigerant container above the storage compartment, an enclosure for said container formed at least in part by a partition below said container, means to conduct cold air from said enclosure to the lower part of said storage compartment and means to direct warm air from the upper part of said storage compartment to said enclosure, said partition comprising a relatively thin metallic sheet, whereby the upper part of said storage compartment is refrigerated by conduction through said partition and spaced apart waterproof slats underlying substantially the entire area of said metallic sheet, whereby said slats prevent dripping of condensed moisture into the storage compartment and permit air in said compartment to contact the lower surface of said metallic sheet.

3. In a refrigerator having a storage compartment, the combination of a refrigerant container above the storage compartment, said container including an opening for overflow of a liquid refrigerant, an enclosure for said container formed at least in part by a partition below said container, means to conduct cold air from said enclosure to the lower part of said storage compartment, said means and partition cooperating to form a substantially watertight path to conduct said liquid refrigerant to the lower part of the car and means to direct warm air from the upper part of said storage compartment to said enclosure, said partition comprising a waterproof upper part having a relatively high thermal conductivity, whereby the upper part of said storage compartment is refrigerated by conduction through said partition and spaced apart waterproof slats underlying substantially the entire area of said upper part, whereby said slats prevent dripping of condensed moisture into the storage compartment and permit air in said compartment to contact the lower surface of said upper part.

4. In a refrigerator having a storage compartment, the combination of a refrigerant container above the storage compartment, an enclosure for said container formed at least in part by a partition below said container, means to conduct cold air from said enclosure to the lower part of said storage compartment and means to direct warm air from the upper part of said storage compartment to said enclosure, said partition comprising a waterproof upper part having a relatively high thermal conductivity, whereby the upper part of said storage compartment is refrigerated by conduction through said partition and spaced apart waterproof slats arranged in two planes below said upper part, the slats disposed in the lower plane underlying the spaces between slats in the upper plane, whereby said slats prevent dripping of condensed moisture into the storage compartment and permit air in said compartment to contact the lower surface of said upper part.

5. In a refrigerator having a storage compartment, the combination of a refrigerant container above the storage compartment, an enclosure for said container formed at least in part by a partition below said container, means to conduct cold air from said enclosure to the lower part of said storage compartment and means to direct warm air from the upper part of said storage compartment to said enclosure, said partition comprising a waterproof upper part having a relatively high thermal conductivity, whereby the upper part of said storage compartment is refrigerated by conduction through said partition and spaced apart waterproof slats arranged in two planes below said upper part, the slats disposed in the lower plane underlying the spaces between slats in the upper plane, said slats extending transversely of the car, whereby said slats prevent dripping of condensed moisture into the storage compartment and permit air in said compartment to contact the lower surface of said upper part.

6. In a refrigerator having a storage compartment, the combination of a refrigerant container above the storage compartment, an enclosure for said container formed at least in part by a partition below said container, means to conduct cold air from said enclosure to the lower part of said storage compartment and means to direct warm air from the upper part of said storage compartment to said enclosure, said partition comprising a waterproof upper part having a relatively high thermal conductivity, whereby the upper part of said storage compartment is refrigerated by conduction through said partition and a plurality of longitudinally extending slats below said upper part arranged with the longitudinally extending margin of each slat underlying the adjacent margin of the adjacent slat in spaced relation thereto, whereby said slats prevent dripping of condensed moisture into the storage compartment and permit air in said compartment to contact the lower surface of said upper part.

7. In a refrigerator having a storage compartment, the combination of a refrigerant container above the storage compartment, an enclosure for said container formed at least in part by a partition below said container, means to conduct cold air from said enclosure to the lower part of said storage compartment and means to direct warm air from the upper part of said storage compartment to said enclosure, said partition comprising a waterproof upper part having a relatively high thermal conductivity, whereby the upper part of said storage compartment is refrigerated by conduction through said partition and spaced apart waterproof slats arranged in two planes below said upper part, the slats disposed in the lower plane underlying the spaces between slats in the upper plane and being inclined toward said first mentioned means and arranged to drain liquid thereinto, whereby said slats prevent dripping of condensed moisture into the storage compartment and permit air in said compartment to contact the lower surface of said upper part.

8. In a refrigerator having a storage compartment, the combination of a refrigerant container above the storage compartment, an enclosure for said container formed at least in part by a partition below said container, means to conduct cold air from said enclosure to the lower part of said storage compartment and means to direct warm air from the upper part of said storage compartment to said enclosure, said partition comprising a waterproof upper part having a relatively high thermal conductivity, whereby the upper part of said storage compartment is refrigerated by conduction through said partition and spaced apart waterproof slats arranged in two planes below said upper part, the slats disposed in the lower plane underlying the spaces between slats in the upper plane, said slats being formed to guide liquid to said first mentioned means, whereby said slats prevent dripping of condensed moisture into the storage compartment and permit air in said compartment to contact the lower surface of said upper part.

ALFRED G. BANCROFT.